US011649916B2

(12) United States Patent
Heine

(10) Patent No.: US 11,649,916 B2
(45) Date of Patent: May 16, 2023

(54) CONNECTOR SYSTEM FOR AN AIRCRAFT, AND AIRCRAFT

(71) Applicant: AIRBUS OPERATIONS GMBH, Hamburg (DE)

(72) Inventor: Andreas Heine, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 452 days.

(21) Appl. No.: 16/861,736

(22) Filed: Apr. 29, 2020

(65) Prior Publication Data

US 2020/0393074 A1 Dec. 17, 2020

(30) Foreign Application Priority Data

Apr. 30, 2019 (DE) ............ 10 2019 206 140.0

(51) Int. Cl.
*F16L 55/10* (2006.01)
*F16B 7/10* (2006.01)
*B64F 1/28* (2006.01)
*B64F 1/36* (2017.01)

(52) U.S. Cl.
CPC .......... *F16L 55/1015* (2013.01); *F16B 7/105* (2013.01); *B64F 1/28* (2013.01); *B64F 1/36* (2013.01)

(58) Field of Classification Search
CPC ........ F16L 55/1015; F16B 7/105; B64F 1/28; B64F 1/36
See application file for complete search history.

(56) References Cited

U.S. PATENT DOCUMENTS

| 2,649,315 | A | * | 8/1953 | Ipsen | ............ F01D 9/06 285/422 |
| 3,329,449 | A | * | 7/1967 | Herold | ............ F16L 27/053 285/272 |
| 3,853,336 | A | * | 12/1974 | Shank | ............ F01D 25/24 285/302 |
| 4,127,215 | A | * | 11/1978 | Morrison | ............ B64C 1/1407 220/259.3 |

(Continued)

FOREIGN PATENT DOCUMENTS

| DE | 10 2011 082 762 A1 | 3/2013 |
| EP | 2 261 543 A2 | 12/2010 |

OTHER PUBLICATIONS

German Search Report for Application No. 10 2019 206 140.0 dated Nov. 4, 2019.

*Primary Examiner* — Anita M King
(74) *Attorney, Agent, or Firm* — KDW Firm PLLC

(57) ABSTRACT

A connector system for an aircraft, for connecting a hose line, includes a skin panel which has a clearance which extends between an external face and an internal face, a primary part which on the clearance is disposed on an internal side of the skin panel that is defined by the internal face, a cover mounted on the primary part and movable between a closing position in which the cover covers the clearance of the skin panel, and an opening position in which the cover releases the clearance of the skin panel, and a tubular connector port mounted on the primary part and movable between a storage position in which the connector port is disposed on the internal side of the skin panel, and a use position in which the connector port projects beyond the external face of the skin panel.

10 Claims, 6 Drawing Sheets

(56) References Cited

U.S. PATENT DOCUMENTS

| | | | | |
|---|---|---|---|---|
| 5,009,455 | A | * | 4/1991 | Irvine .................... F16L 27/12 |
| | | | | 285/302 |
| 5,290,996 | A | * | 3/1994 | Giamati .................. B64D 1/16 |
| | | | | 244/136 |
| 6,059,323 | A | | 5/2000 | Ekholm et al. |
| 7,246,639 | B2 | * | 7/2007 | Kuntz ...................... B64F 1/28 |
| | | | | 141/311 A |
| 9,365,297 | B2 | * | 6/2016 | Wright ............... B60H 1/00264 |
| 9,599,263 | B2 | | 3/2017 | Lutzer |
| 10,155,595 | B2 | * | 12/2018 | Wright ............... B60H 1/00264 |

\* cited by examiner

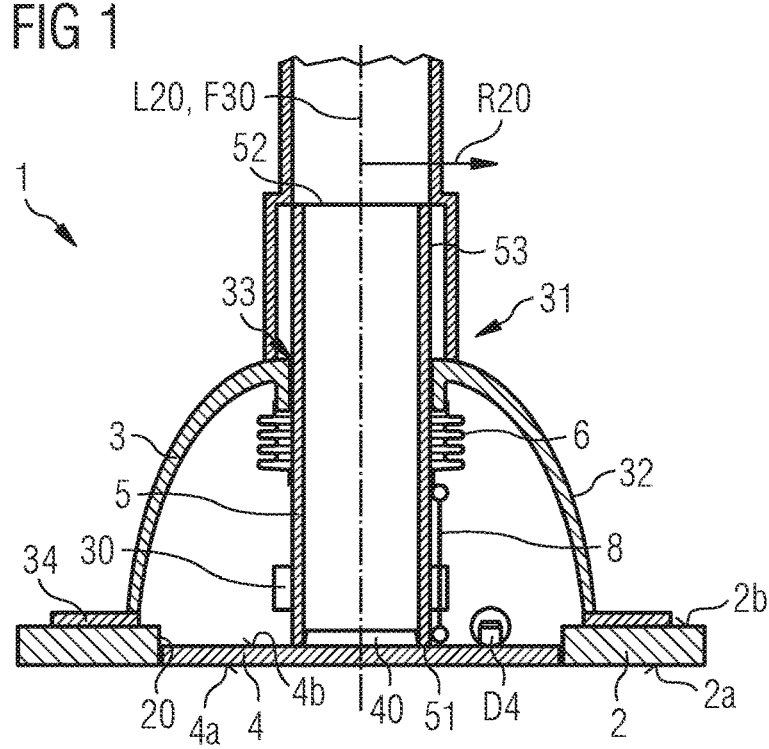
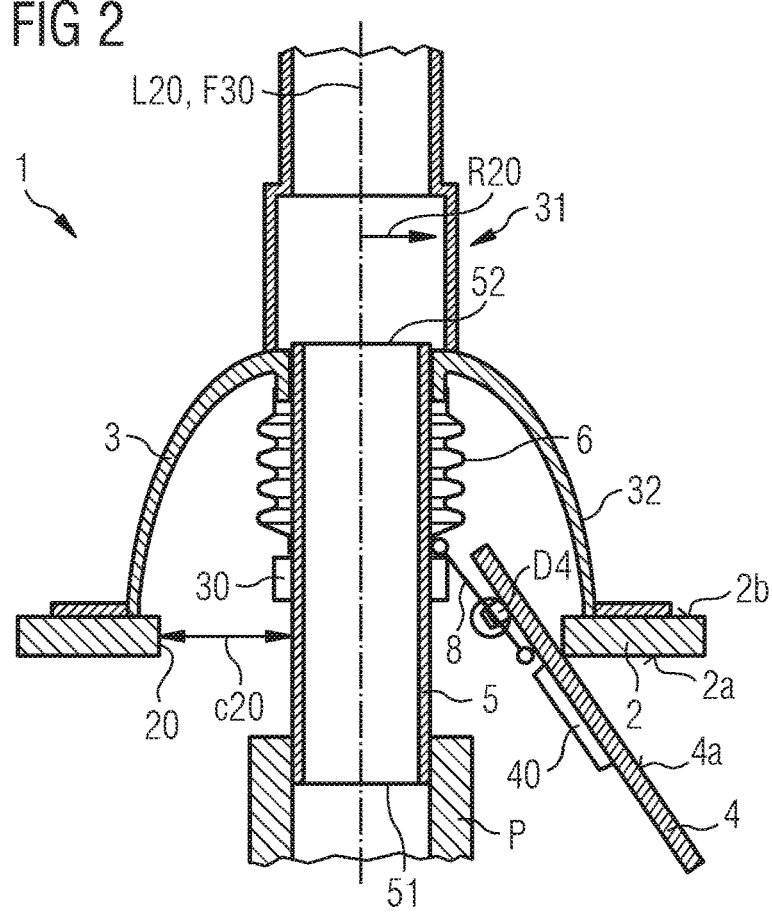

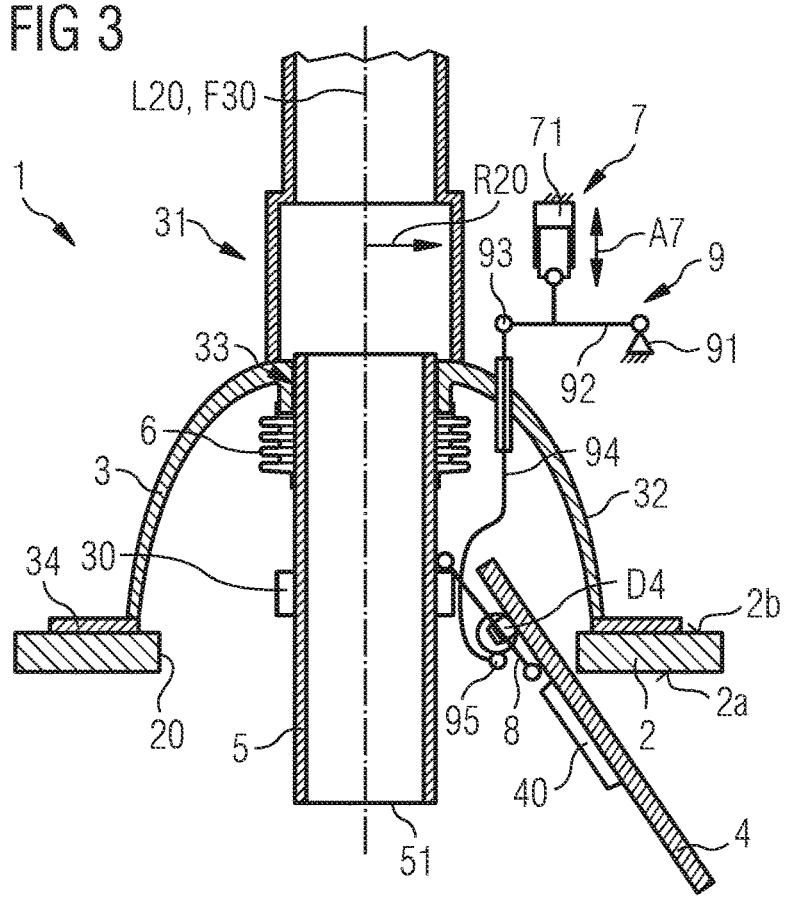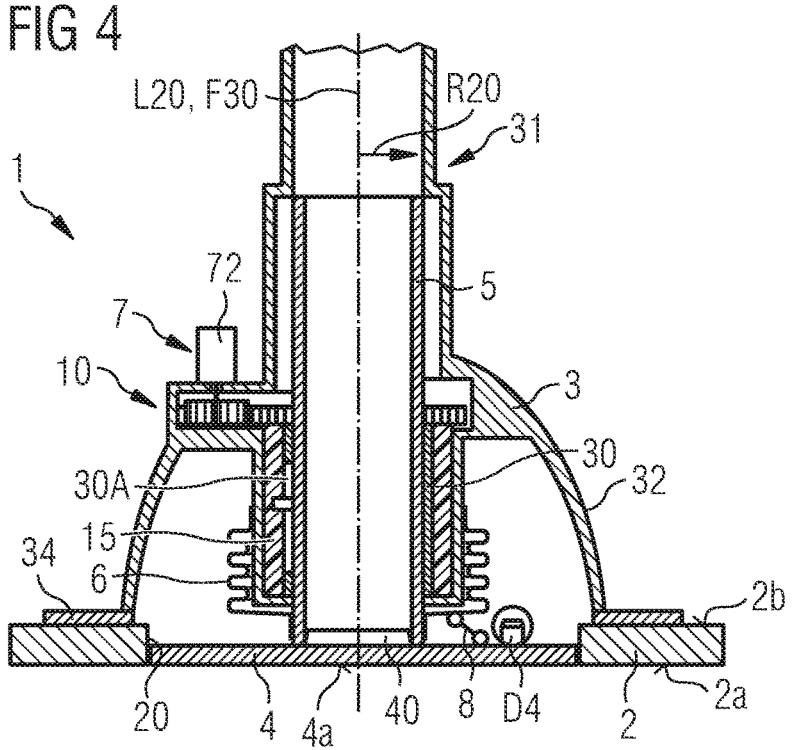

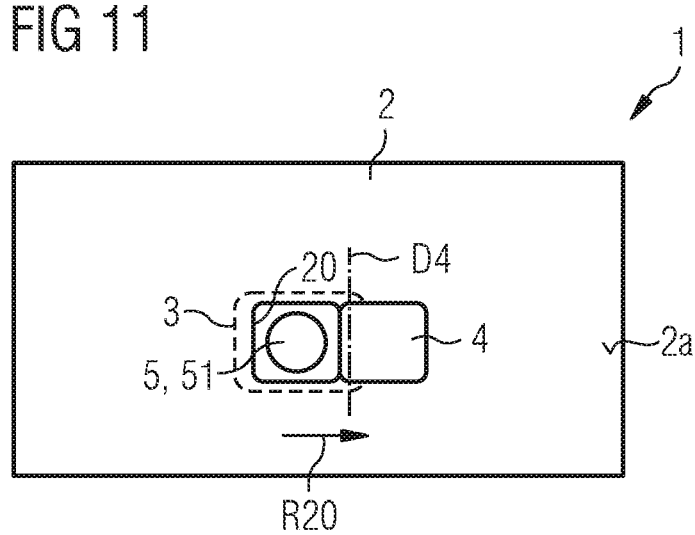
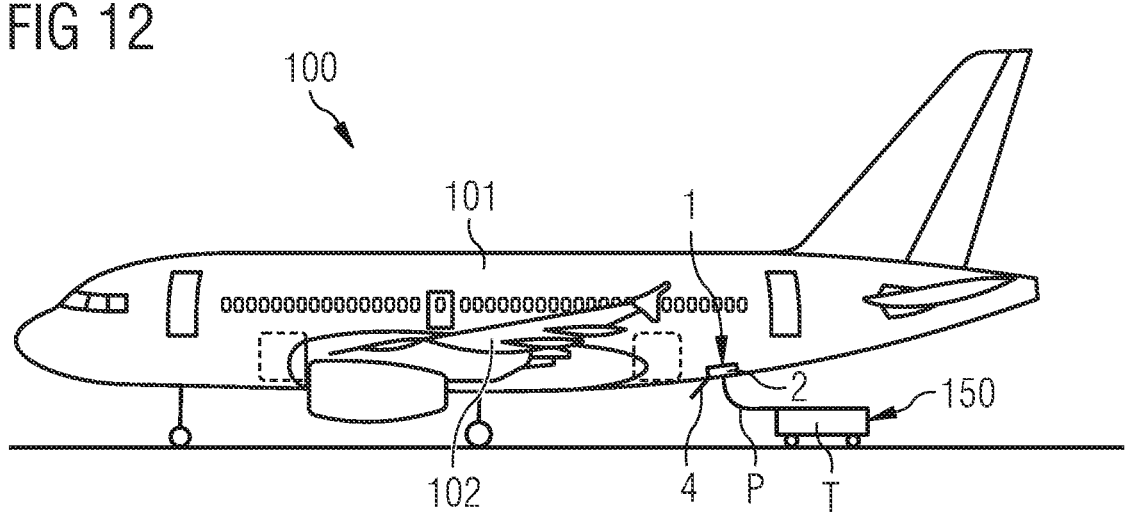

CONNECTOR SYSTEM FOR AN AIRCRAFT, AND AIRCRAFT

CROSS-REFERENCE TO RELATED APPLICATION

This application claims priority to DE 10 2019 206 140.0 filed Apr. 30, 2019, the entire disclosure of which is incorporated by reference herein.

TECHNICAL FIELD

The disclosure herein relates to a connector system for an aircraft, for connecting a hose line, as well as to an aircraft having such a connector system.

BACKGROUND

Tanks for receiving liquids such as, for example fresh water or wastewater, are usually provided in aircraft, in particular in passenger aircraft. These tanks are usually filled or emptied, respectively, while the aircraft is on the ground. The tanks by a pipeline are typically provided with a connector port of a so-called service panel. The service panel is disposed on an internal side of an external skin of the aircraft and is accessible by way of a clearance provided in the external skin. In order for a tank to be filled or emptied, an external hose line is guided through the clearance of the external skin and connected to the connector port. In order for a mechanical connection to be able to be established between the connector port and the hose line, a certain degree of spatial access to the connector port is typically implemented by dimensioning the clearance and the service panel in a corresponding manner.

DE 10 2011 082 762 A1 describes a coupling for a service panel of an aircraft.

SUMMARY

It is an object of the disclosure herein to provide solutions for connecting a hose line to an aircraft, the solutions having a reduced space requirement and being comfortable to handle.

This object is in each case achieved by a connector system and an aircraft as disclosed herein.

According to a first aspect of the disclosure herein, a connector system for an aircraft, for connecting a hose line, is provided. The connector system comprises a skin panel which has a clearance which extends between an external face and an internal face, a primary part which on the clearance is disposed on an internal side of the skin panel that is defined by the internal face, and a cover which is mounted on the primary part and is movable between a closing position in which the cover covers the clearance of the skin panel, and an opening position in which the cover releases the clearance of the skin panel. The connector system furthermore has a tubular connector port which is mounted on the primary part and is movable between a storage position in which the connector port is disposed on the internal side of the skin panel, and a use position in which the connector port projects beyond the external face of the skin panel.

According to a second aspect of the disclosure herein, an aircraft, in particular an aircraft having a connector system according to the first aspect of the disclosure herein, is provided. The skin panel of the connector system can form, for example, part of an external skin of a fuselage or of a wing of the aircraft.

One concept on which the disclosure herein is based lies in mounting a connector port to which an external hose line is able to be connected in mechanical and hydraulic terms so as to be movable on a primary part, or a holding structure, respectively, in such a manner that the connector port in a use position protrudes from a clearance of a skin panel of the aircraft. The primary part, or the holding structure, respectively, is disposed in the region of the clearance of the skin panel and is preferably fastened to an internal face of the skin panel, the latter potentially being formed, for example, from a fibre-composite material. A cover is mounted on the primary part, wherein the cover in a closing position covers the clearance of the skin panel, for example in that the cover is disposed in the clearance such that an external face of the cover is flush with the external face of the skin panel. The cover in an opening position releases the clearance which forms a through opening through the skin panel and defines a clearance longitudinal axis, or a central axis, respectively. The connector port, which has a tubular line portion and a front connector region which is provided at an axial end of the line portion, in the opening position of the cover can be moved from a storage position to the use position such that the connector port at least in part protrudes through the opening and projects beyond the external skin of the skin panel, for example at least by way of the front connector region.

One of the advantages of the disclosure herein lies in that the connector port in the storage position is completely disposed below, or within, respectively, an external face of the skin panel such that the clearance of the skin panel is able to be closed by the cover, and in the use position protrudes from the clearance of a skin panel. On account thereof, an external hose line such as, for example a wastewater hose, can be comfortably connected to the connector port outside the clearance. At the same time, the clearance per se can be implemented so as to have a relatively small diameter since it is avoided on account of the clearance that the external hose is introduced. The reduction in the diameter of the clearance improves the mechanical strength of the skin panel and at the same time advantageously reduces the aerodynamic influence of the clearance on a laminary flowing along the external face of the skin panel when in flight.

Advantageous design embodiments and refinements are disclosed herein.

According to one embodiment it is provided that the cover and the connector port are kinematically coupled in such a manner that a movement of the cover or of the connector port causes a movement of the respective other of the cover and connector port. This comprises a direct kinematic coupling between the cover and connector port, wherein the cover per se drives the connector port, or vice versa, respectively, as well as an indirect kinematic coupling, wherein the connector port and the cover by way of a preferably common gearbox are coupled to a common drive installation. The kinematic coupling of the cover and the connector port facilitates the operation of the system. Erroneous operations are in particular advantageously precluded since the port is automatically moved to the use position thereof when the cover is moved into the opening position of the latter, for example. This reduces the risk of attempting to introduce the external hose which is to be connected to the connector port into the clearance of the skin panel, for example.

According to one further embodiment it is provided that the primary part has a guide portion which defines a linear guide track along which the connector port is guided between the use position and the storage position. For example, the guide portion can be formed by a guide rail, wherein the connector port per se has a guide structure, for example a groove, which is guided in the guide rail. The guide portion can also be formed by a tubular structure which at least in part encloses the connector port. The linear guide track defined by the guide rail extends along the clearance longitudinal axis of the clearance of the skin panel. An optional kinematic coupling of the cover and of the connector portion in the case of linear guiding of the connector port and pivotable mounting of the cover about a rotation axis that extends transversely to the clearance longitudinal axis can be implemented, for example, by way of a connecting rod that is coupled to the cover and to the connector port. A pivoting movement of the cover is converted to a linear movement of the port by way of the connecting rod. The linear guiding of the connector portion offers the advantage of a simple design in terms of construction. Furthermore, the diameter of the clearance of the skin panel can be further reduced.

According to one further embodiment, the connector port is guided on the primary part so as to be pivotable about a rotation axis between the use position and the storage position, wherein in the use position a first end of the connector port projects beyond the external face of the skin panel, and a second end of the connector port is coupled to a pipeline connector of the primary part that is opposite the clearance of the skin panel, and wherein in the storage position the second end of the connector port is decoupled from the pipeline connector. This example design is based on the concept of pivoting the connector port out of the clearance. The connector port in the storage position extends so as to be transverse to the clearance longitudinal axis, or the central axis, respectively, of the clearance, and by way of a rear end, or second end, respectively, is mechanically separated from a pipeline connector of the primary part that is provided for connecting to a line emanating from a liquids tank of the aircraft, or is spaced apart from the pipeline connector, respectively. When moved to the use position, the port is pivoted about a rotation axis which extends so as to be transverse to the central axis of the clearance such that the rear end is connected to the pipeline connector, and a first end, or front end, respectively, where the connector region of the port is provided, is pivoted out of the clearance. One of the advantages of this design lies in a construction of the system that is compact along the central axis.

It can furthermore be provided that the connector port has a blocking portion having a sealing face which by way of a constant radius is curved about the rotation axis and which in the storage position of the connector port bears on the pipeline connector and covers a flow cross section of the pipeline connector. Accordingly, the connector port can be implemented in the manner of a ball valve having a blocking portion, for example in the form of a spherical segment, wherein the blocking portion in the storage position covers the pipeline connector in a sealing manner, and wherein the blocking portion in the use position releases the pipeline connector, and a flow cross section of the connector port is connected to the pipeline connector. Reliable sealing of the pipeline port is thus achieved in a simple manner.

An optional kinematic coupling of the cover and the connector portion in the case of rotational guiding of the connector port and pivotable mounting of the cover about a rotation axis that extends so as to be transverse to the clearance longitudinal axis can be implemented, for example, by a connecting rod that is coupled to the cover and to the connector port. It is also conceivable for the cover and the connector port to be fixedly connected to one another such that the cover and the connector port are disposed in a mutually stationary manner. The pivoting movement of the cover is thus automatically converted to a pivoting movement of the port.

Alternatively to the ball valve principle described in the case of the pivotable mounting of the port, the connector port in relation to the primary part can be sealed by a sealing sleeve. This applies to pivotable guiding as well as to linear guiding of the port. The sealing sleeve can in particular be formed from an elastically deformable material such as, for example, a rubber material. The sleeve encloses a circumference of the line portion of the connector port, and furthermore encloses, for example, the pipeline connector of the primary part or a passage of the primary part through which the line portion of the connector port extends.

According to one further embodiment, it is generally provided that the cover is pivotable about a rotation axis which extends so as to be transverse to a central axis of the clearance of the skin panel.

Alternatively thereto, in particular when the connector port is guided so as to be displaceable in a linear manner in the primary portion, it is provided that the primary part has a cover guide structure which defines a linear guide axis which extends along a central axis of the clearance of the skin panel, wherein the cover is mounted on the cover guide structure so as to be displaceable along the guide axis and pivotable about the guide axis. In order for the cover to be moved out of the closing position to the opening position, the cover can thus first be moved in a linear manner along the guide axis such that the cover is moved away from the external face of the skin panel, and subsequently can be rotated about the guide axis so as to eliminate any overlap with the clearance. The linear movement and the pivoting movement can also be carried out so as to be combined or simultaneous, respectively, such that the cover is moved according to a helical movement path. The cover guide structure can be formed, for example, by a guide tube in which a guide rod of the cover is guided. The guide tube can have, for example, a helically running groove into which a pin provided on the guide rod engages such that the desired helical movement of the cover takes place when the guide rod is repositioned along the guide tube. Of course, other possibilities of guiding are also conceivable. One advantage of this embodiment lies in that the cover is able to be moved completely out of the clearance, on account of which the diameter of the clearance can be further reduced.

According to one further embodiment, the system has a drive installation which is coupled to the cover so as to move the latter between the opening position and the closing position, or is coupled to the connector port so as to move the latter between the storage position and the use position. It can in particular be provided that the cover and the port are kinematically coupled to one another, and a drive installation is provided for driving the cover and/or the port. For example, the cover when mounted about a rotation axis that extends so as to be transverse to the clearance longitudinal axis and when kinematically coupled to the port by way of a rod, can be pivoted between the closing and the opening position by way of a linear drive, for example a hydraulic or pneumatic cylinder or a spindle drive, which in turn by a coupling rod is coupled to the cover, on account of which the port is conjointly moved. Of course, the port can also be repositioned in a linear manner between the use position and the storage position, for example by an electric motor which drives a drive spindle that is coupled to the port. The cover herein, in the case of a corresponding kinematic coupling, is automatically moved from the closing position to the opening position when the port is moved from the use position to the storage position. It is also conceivable for a gear rim to be provided on the cover or the connector port, and for the gear rim to be driven by a gear wheel that is connected to a shaft of an electric motor so as to conjointly pivot the cover and the connector port.

With regard to directional indications and axes, in particular directional indications and axes relating to the profile of physical structures, a path of an axis, of a direction or of a structure "along" another axis, direction or structure is understood here as meaning that these, in particular the tangents that arise at a respective point of the structures, run in each case at an angle of less than 45 degrees, preferably less than 30 degrees, and particularly preferably parallel, to one another.

With regard to directional indications and axes, in particular directional indications and axes relating to the profile of physical structures, a path of an axis, of a direction or of a structure that is "transverse" with respect to another axis, direction or structure is understood here as meaning that these, in particular the tangents that arise at a respective point of the structures, run in each case at an angle of greater than or equal to 45 degrees, preferably greater than or equal to 60 degrees, and particularly preferably perpendicular, to one another.

Components formed "in one piece", "in one part", "integrally" or "as one piece" are generally understood herein to mean that these components are present as a single part forming a material unit and in particular are produced as such, wherein one component is not releasable from the other component without elimination of the material cohesion from the other component.

BRIEF DESCRIPTION OF THE DRAWINGS

The disclosure herein will be explained hereunder with reference to the figures of the drawings. In the figures:

FIG. 1 shows a schematic sectional view of a connector system according to one exemplary embodiment of the disclosure herein, wherein a connector port is illustrated in a storage position and a cover is illustrated in a closing position;

FIG. 2 shows a schematic sectional view of the connector system from FIG. 1, wherein the connector port is illustrated in a use position and the cover is illustrated in an opening position;

FIG. 3 shows a schematic sectional view of a connector system according to one further exemplary embodiment of the disclosure herein, wherein a connector port is illustrated in a use position, and a cover is illustrated in an opening position;

FIG. 4 shows a schematic sectional view of a connector system according to one further exemplary embodiment of the disclosure herein, wherein a connector port is illustrated in a storage position, and a cover is illustrated in a closing position;

FIG. 11 shows a schematic plan view of a system according to an exemplary embodiment of the disclosure herein, wherein the cover is illustrated in an opening position; and FIG. 12 shows a schematic illustration of an aircraft according to an exemplary embodiment of the disclosure herein.

Figure 5:
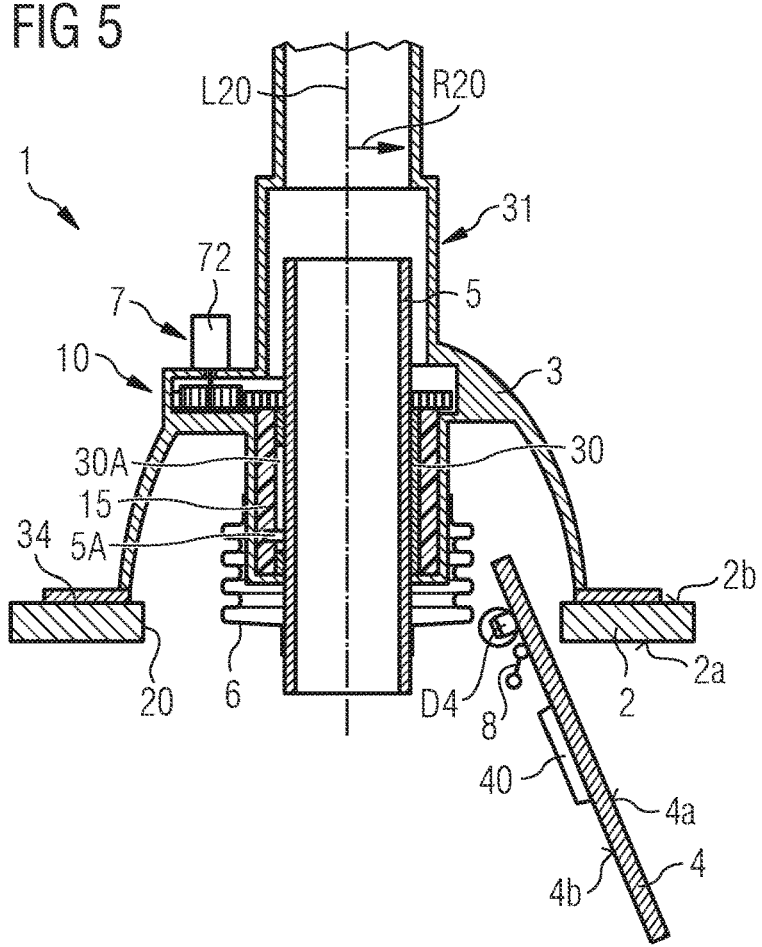
FIG. 5 shows a schematic sectional view of the connector system from FIG. 4, wherein the connector port is illustrated in a use position, and the cover is illustrated in an opening position.

In the figures, the same reference signs refer to identical or functionally equivalent components, unless otherwise stated.

DETAILED DESCRIPTION

FIG. 1 in an exemplary and schematic manner shows a connector system 1 for connecting a hose line P. FIG. 2 shows the system 1 according to FIG. 1 in a state in which a hose line P is connected to a connector port 5 of the system 1. FIG. 12 shows a schematic view of an aircraft 100 having the connector system 1. The connector system 1 explained in detail hereunder serves for connecting a hose line P to an aircraft 100 so as to discharge liquid from a tank (not illustrated) of the aircraft 100, or so as to supply the tank. As is illustrated in an exemplary manner in FIG. 12, wastewater from a wastewater tank of the aircraft 100 can be discharged by way of the hose line P which is connected by the system 1 into a tank T of a service vehicle 150 on the tarmac for example. Of course, filling of a freshwater tank can take place in the same manner. While the connector system 1 hereunder is described in an exemplary manner in the context of filling and emptying water tanks of the aircraft 100, the connector system 1 can also be used in conjunction with other tanks of the aircraft 100, for example in conjunction with a fuel tank.

As is illustrated in an exemplary manner in FIG. 1, the connector system 1 has a skin panel 2, a primary part 3, a cover 4, a connector port 5, and an optional sealing sleeve 6.

The skin panel 2 in FIG. 11 is illustrated in an exemplary manner in a plan view and has a planar extent. For example, the skin panel 2 can be implemented as a rectangular plate-shaped or dish-shaped component. The skin panel 2 is optionally curved. As is shown in FIG. 1, the skin panel 2 has a first surface, or external face 2a, respectively, and a second surface or internal face 2b, respectively, which is oriented so as to be opposite to the first surface or external face 2a, respectively. The external face 2a defines an external side and, when the skin panel 2 is installed in the fuselage 101 or a wing 102 of the aircraft 100, forms a flow surface. The internal face 2b defines an internal side of the panel 2. As can be seen in FIGS. 1 and 11, the skin panel 2 has a clearance 20 in the form of a through opening which extends between the external face 2a and the internal face 2b. For example, the clearance 20 can have a circular circumference, or a rectangular circumference, as is shown in an exemplary manner in FIG. 11. The clearance 20 on account of the circumference thereof defines a central axis or a clearance longitudinal axis L20. The skin panel 2 can in particular be formed from a fibre-composite material such as, for example, a carbon-fibre-reinforced plastics material, abbreviated as CRP.

The primary part 3 forms a mounting or a support, respectively, for the further components of the system 1. As is illustrated in an exemplary manner in FIG. 1, the primary part 3 can in particular have a dome-shaped or trough-shaped main portion 32 which defines an internal space, and a flange portion 34 which peripherally is connected to the main portion 32, or any other connection portion. As is furthermore illustrated in FIG. 1, the primary part 3 has a through opening 33 which is configured on the main portion 32, for example. Moreover, the primary part 3 optionally has a guide portion 30 which defines a linear guide track F30. The guide portion 30 can be formed by a guide bushing or a guide rail which is connected to the main portion 32, for example. The main portion 32 and the flange portion 34, optionally also the guide portion 30, can in particular be formed in one piece or in one part, and are preferably formed from a metal material, for example an aluminum alloy.

As is illustrated in an exemplary manner in FIG. 1, the primary part 3 is disposed on the internal side of the skin panel 2 in the region of the clearance 20. The primary part 3, or the main portion 32, respectively, in particular overlaps the clearance 20 such that the internal space defined by the main portion 32 is accessible from the external side of the skin panel 2 by way of the clearance 20. For example, the primary part 3 by the flange portion 34 can bear on the internal face 2b of the skin panel 2 and is fastened to the skin panel 2 in that the flange portion 34 and the skin panel 2 are riveted to one another, for example.

As is furthermore illustrated in an exemplary manner in FIG. 1, an optional pipeline connector 31 which is provided for connecting to the tank of the aircraft 100 can be connected to the primary part 3. In particular, the pipeline connector 31 can be implemented as a tubular piece which is connected to the main portion 32 at the through opening 33, as is illustrated in an exemplary manner in FIG. 1.

The cover 4 is implemented as a plate-shaped or dish-shaped component with a planar extent. In particular, the cover 4 can have a circumference which corresponds to the clearance 20 of the skin panel 2, as is illustrated in an exemplary manner in FIG. 11. The cover 4 is mounted so as to be movable on the primary part 4. In the system 1 which is illustrated in an exemplary manner in FIG. 1 the cover 4 is mounted so as to be pivotable about a rotation axis D4 which extends so as to be transverse to a central axis L20 of the clearance 20 of the skin panel 2. The rotation axis D4 can be defined, for example, by a rotary joint (not illustrated) which has a first joint structure, for example a clearance, which is connected to the primary part 3, and a second joint structure, for example a pin, which is connected to the cover 4, wherein the first and the second joint structure are in mutual engagement. The cover 4 is movable between a closing position and an opening position. The cover 4 in FIG. 1 is illustrated in the closing position in which the cover 4 covers the clearance 20 of the skin panel 2. For example, the cover 4 by way of the circumference thereof in the closing position can be disposed completely within the clearance 20, as is illustrated in an exemplary manner in FIG. 1, wherein an external face 4a of the cover 4 is preferably disposed so as to be flush with the external face 2a of the skin panel 2. The cover 4 in the opening position which is illustrated in an exemplary manner in FIG. 2 at least partially releases the clearance 20, in particular in the region of the clearance longitudinal axis L20. In the system 1 that is illustrated in an exemplary manner in FIGS. 1 and 2 the rotation axis D4 of the cover 4 in terms of a radial direction R20 that is perpendicular to the clearance longitudinal axis L20 is disposed within the clearance 20.

The connector port 5 is generally implemented as an elongate tubular portion, such as is schematically illustrated in FIG. 1, and serves for connecting to an external hose line P. The connector port 5 has a front end 51 which forms a connector region, or a connector structure, respectively, for connecting the external hose line P, a second end 52 which is opposite the first end 51, and an elongate line portion 53 which extends between the ends 51, 52. The line portion 53 defines a flow cross section or line cross section of the connector port 5 that is open at the ends 51, 52. The connector port 5 can be formed from a metal material such as, for example, an aluminum alloy or a titanium alloy.

In the system 1 that is shown in an exemplary manner in FIG. 1 the front end 51 of the connector port 5 lies so as to face the clearance 20 of the skin panel 2, the line portion 53 is guided through the through opening 33 of the primary part 3, and the rear end 52 is fluidically conductively connected to the pipeline connector 31. It is also conceivable for the pipeline connector 31 to be formed by the rear end 52 of the connector port 5, for example by a thread or a flange configured on the rear end 52. Furthermore, the connector port 5, for example by way of the line portion 53, can be guided in a linear manner along the guide track 30 by the optional guide structure 30 of the primary part 3. The connector port 5 is generally mounted on the primary part 3 so as to be movable between a storage position and a use position.

FIG. 1 shows in an exemplary manner the storage position of the connector port 5. In the storage position the front end 51 of the connector port 5 in terms of the clearance longitudinal axis L20 is retracted in relation to the external face 2a of the skin panel 2. The connector port 5, or the front end 51 of the connector port 5, respectively, in the storage position is thus disposed on the internal side of the skin panel 2. For example, the connector port 5 in the storage position, by way of the front end 51, can bear on an internal face 4b of the cover 4 when the latter is disposed in the closing position, as is illustrated in an exemplary manner in FIG. 1. The cover 4 on the internal face 4b thereof optionally has a closure hump 40 which, when the cover 4 is disposed in the closing position and the connector port 5 is disposed in the storage position, covers the flow cross section of the connector port 5, or is introduced into the latter, respectively, as is shown in an exemplary manner in FIG. 1.

FIG. 2 in an exemplary manner shows the use position of the connector port 5. As can be seen in FIG. 2, the connector port 5 in the use position protrudes through the clearance 20 of the skin panel 2 to the external side. The connector port 5, in particular by way of the front end 51 thereof, generally projects beyond the external face 2a of the skin panel 2. In order for the external hose line P to be connected, the cover 5 can thus be moved from the closing position to the opening position, and the connector port 5 is moved out of the storage position thereof (FIG. 1) to the use position thereof (FIG. 2), for example by displacing the port in a linear manner in the guide structure 30 of the primary part 3. As can be seen in FIG. 2, the front end 51 by way of the connector structure of the connector port 5 in the use position protrudes out of the clearance 20 of the skin panel 2 and is thus readily accessible from the external side in order for the hose line P to be fastened thereto. A gap c20 between the connector port 5 and the clearance 20 in the use position of the connector port 5 can thus be relatively small since the internal side does not have to be accessible through the clearance 20 in order for the hose line P to be connected to the connector port 5. Consequently, the clearance 20 can be implemented so as to have a comparatively small diameter, this having a favourable effect in terms of the mechanical strength of the skin panel 2 and the aerodynamics of the external face 2a. The handling of the system 1 is furthermore facilitated.

The optional sealing sleeve 6 serves for sealing, in particular for sealing the connector port 5 in a fluid-tight manner in relation to the primary part 3. As is schematically illustrated in FIG. 1, the sealing sleeve or sealing collar 6 is implemented as a sleeve-shaped or tubular component which in terms of the longitudinal extent thereof is corrugated or undulated. The sealing sleeve 6 is made of an elastically deformable flexible material such as, for example, a rubber material based on natural rubber or silicone. The sealing sleeve 6 on account of the corrugated design and/or on account of the elastic material is variable in the longitudinal extent thereof. The sealing sleeve 6 encloses the connector port 5 on the external circumference thereof, for example in the region of the line portion 53, as is illustrated in an exemplary manner in FIG. 1, and by way of a first end is fastened to the connector port 5. The sealing sleeve 6 by way of an opposite end is fastened to the primary part 3, for example to the main portion 32, and encloses the through opening 33 as is illustrated in an exemplary manner in FIG. 1. When the connector port 5 is moved from the storage position to the use position, the sleeve 6 is extended in length and also seals the connector port 5 in relation to the primary part 3 in the use position.

The connector port 5 and the cover 4 are optionally kinematically coupled to one another. This can be implemented by a connecting rod 8, for example, as is schematically illustrated in an exemplary manner in FIGS. 1 and 2, the connecting rod 8 being in each case rotatably coupled to the connector port 5, for example to the line portion 53 thereof, and to the cover 4, in particular to the internal face 4b of the cover 4. The connecting rod 8 can in particular be connected to the cover 4 at a location of the cover 4 which in the closing position of the cover 4 in terms of the radial direction R20 lies between the connector port 5 and the rotation axis D4 of the cover 4. As can be seen in FIGS. 1 and 2, the rotating movement of the cover 4 on account of the kinematic coupling is converted to a translatory movement of the connector port 5 when the cover 4 moves about the rotation axis D4.

The system 1 that is illustrated in an exemplary manner in FIG. 3 differs from the system 1 illustrated in FIGS. 1 and 2 only by way of an optional drive installation 7. The drive installation 7 in FIG. 3 is implemented in an exemplary manner as a linear drive 71 in the form of a hydraulic or pneumatic cylinder. The drive installation 7 is disposed so as to be stationary in relation to the primary part 3 and can be mounted on the latter, for example. As is schematically illustrated in an exemplary manner in FIG. 3, the linear drive 71 can be kinematically coupled to the cover 4 by way of a rod assembly 9. The rod assembly 9 has a first rod 92 which is rotatably mounted on a first joint 91 which is disposed so as to be stationary in relation to the primary part 3, and a second rod 94 which on a second joint 93 is mounted so as to be rotatable on the first rod 92. The first rod 92 is connected to the linear drive 71 and is movable by way of the latter. The second rod 94 by way of a third joint 95 is connected to the cover 4 at a location which is spaced apart from the rotation axis D4 of the cover 4. On account thereof, the linear movement generated by the linear drive 7, as is indicated by the arrow A7 in FIG. 3, can be converted to a pivoting movement of the cover 4 by way of the rod assembly 9. Since the cover 4 is kinematically coupled to the port 5, the pivoting movement of the cover 4 automatically causes a linear movement of the port 5. In the same manner, the connector port 5 could also be coupled to the second rod 94 of the rod assembly 9 by way of the third joint 95 such that a movement A7 of the linear drive 71 is converted to a movement of the connector port 5 by way of the rod assembly 9. The movement of the port 5, on account of the kinematic coupling between the connector port 5 and the cover 4, automatically causes a pivoting movement of the cover 4.

A further connector system 1 which differs from the system 1 illustrated in FIG. 3 only by way of the design of the drive installation 7 and of the kinematic coupling between the cover 4 and the connector port 5 is illustrated in an exemplary manner in FIGS. 4 and 5. In the system 1 that is illustrated in an exemplary manner in FIGS. 4 and 5 the drive installation 7 is implemented by an electric motor 72 which by way of the gearbox 10 and the spindle bushing 15 is kinematically coupled to the connector port 5. The guide structure 30 of the primary part 3 that defines the guide track F30 can be implemented, for example, as a bushing which has a slot 30A that extends along the clearance longitudinal axis L20, an appendage 5A provided on the connector port 5 protruding through the slot 30A. The appendage 5A of the connector port 5 engages with the helically extending groove of the spindle bushing 15, wherein the spindle bushing 15 encloses the guide portion 30 and is rotatable in relation to the latter about the guide axis F30. As is schematically illustrated in FIGS. 4 and 5, a first gear rim is coupled to a drive shaft of the electric motor 72, and a second gear rim which engages with the first gear rim is coupled to the spindle bushing 15. The spindle bushing 15 is thus rotatable by the electric motor 72. The rotation of the spindle bushing 15 causes the appendage 5A of the port 5 to slide down in the groove of the spindle bushing 15, and thus causes the port 5 to be displaced along the guide axis F30 defined by the guide structure 30, on account of which the connector port 5 is movable between the storage position illustrated in FIG. 4 and the use position illustrated in FIG. 5.

In the system 1 that is illustrated in an exemplary manner in FIGS. 4 and 5 the cover 4 and the connector port 5 are kinematically coupled to one another by way of a connecting rod 8. The connecting rod 8 can in each case be rotatably mounted on the cover 4 and the connector port 5, as in FIGS. 1 to 3, for example. Alternatively, it is also conceivable for the connecting rod 8 to be fixedly connected to the cover 4 and for a support structure (not illustrated), for example in the form of a protrusion, on which the connecting rod 8 in the closed state of the cover 4 and in the storage position of the port 5 is supported, to be provided on the connector port 5. When the port 5 by the drive installation 7, for example as has been described above, is moved along the guide axis F30, the connecting rod 8 automatically pushes the cover 4 away and thus causes a movement of the cover 4 to the opening position thereof.

Figure 6:
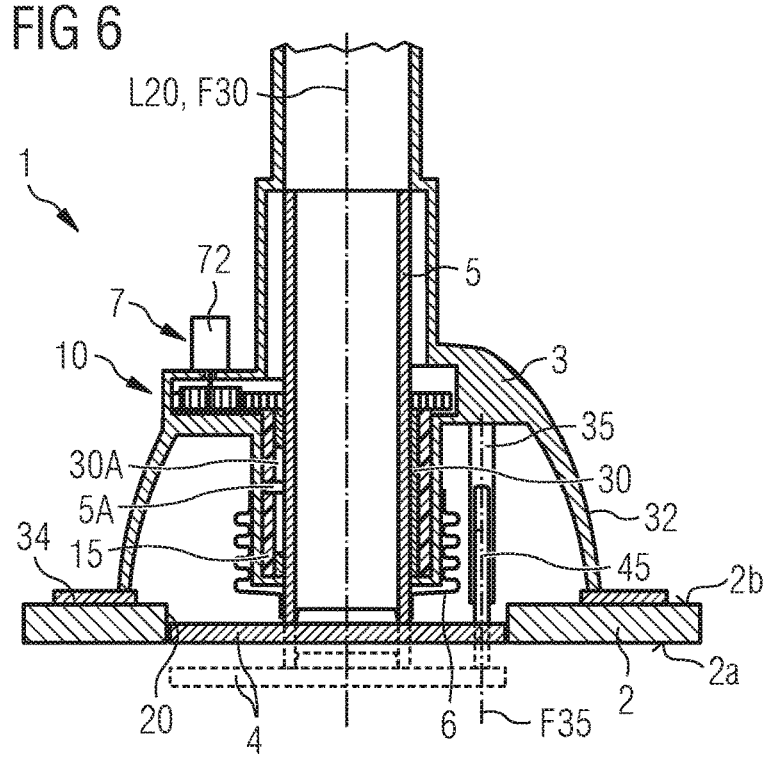
FIG. 6 shows a schematic sectional view of a connector system according to one further exemplary embodiment of the disclosure herein, wherein a connector port is illustrated in a storage position, and a cover is illustrated in a closing position.
Figure 7:
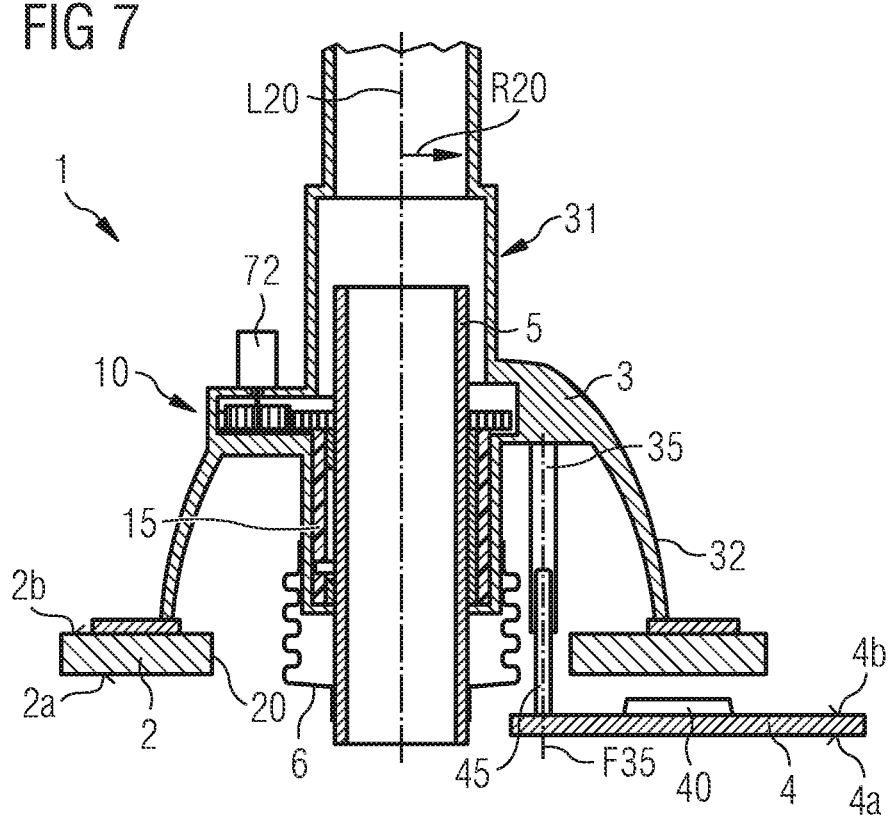
FIG. 7 shows a schematic sectional view of the connector system from FIG. 6, wherein the connector port is illustrated in a use position, and the cover is illustrated in an opening position.

A further connector system 1 which differs from the system 1 that is illustrated in an exemplary manner in FIGS. 4 and 5 only by the mounting of the cover 4 is illustrated in an exemplary manner in FIGS. 6 and 7. The drive installation 7 is implemented as described by FIGS. 4 and 5. Of course, the drive installation 7 described by FIG. 3, and the rod assembly 9 in the system 1 shown in FIGS. 6 and 7, can however also be implemented.

As is schematically illustrated in FIGS. 6 and 7, the primary part 3 can have a cover guide structure 35. The cover guide structure 35 can be formed, for example, by a bushing which is fastened to the main portion 32, or is configured in one piece with the latter, as is shown in an exemplary manner in FIGS. 6 and 7. The cover guide structure 35 defines a linear guide axis F35 which extends along the central axis L20 of the clearance 20. At the same time, the cover guide structure 35 defines a rotation axis which is identical to the guide axis F35. The cover 4 has a bearing structure 45, for example in the form of a shaft that projects from the internal face 4b. The bearing structure 45 is engaged with the cover guide structure 35. For example, the internal face of the sleeve and the external face of the shaft can in each case be circular and bear on one another. The cover 4 is thus mounted on the cover guide structure 35 so as to be displaceable along the guide axis F35, and rotatable about the guide axis F35.

The cover 4 in FIG. 6 is illustrated by solid lines in the closing position, and by dashed lines in an intermediate position. The cover 4 in the intermediate position in relation to the closing position has been moved along the guide axis F35 out of the clearance 20 of the skin panel 2 such that the cover 4 is spaced apart from the external face 2a of the skin panel 2. The cover 4 in FIG. 7 is illustrated in the opening position in which the cover 4 in terms of the radial direction R20 largely releases the clearance 20. The cover 4 is pivoted about the guide axis F35 from the intermediate position to the opening position. The cover 4 can be coupled to the electric motor 72, for example, by way of a further spindle bushing (not illustrated) which encloses the cover guide structure 35 and a further gear rim (not illustrated). The connector port 5 and the cover 4 are thus kinematically coupled to one another, or to the drive installation 7, respectively, by way of the gearbox 10.

Figure 8:
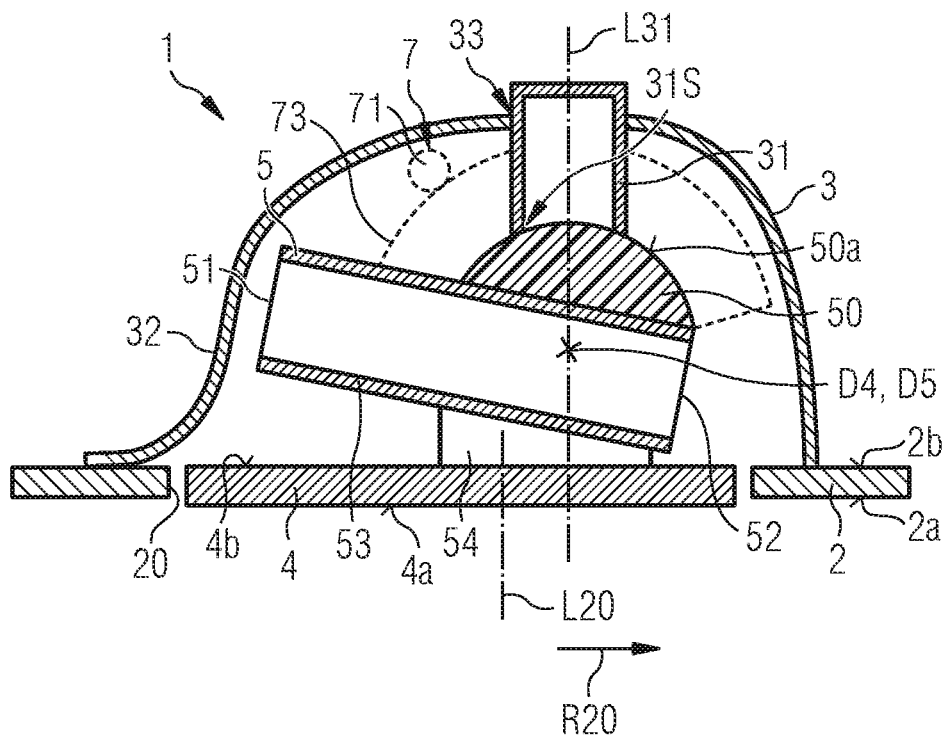
FIG. 8 shows a schematic sectional view of a connector system according to one further exemplary embodiment of the disclosure herein, wherein a connector port is illustrated in a storage position, and a cover is illustrated in a closing position.
Figure 9:
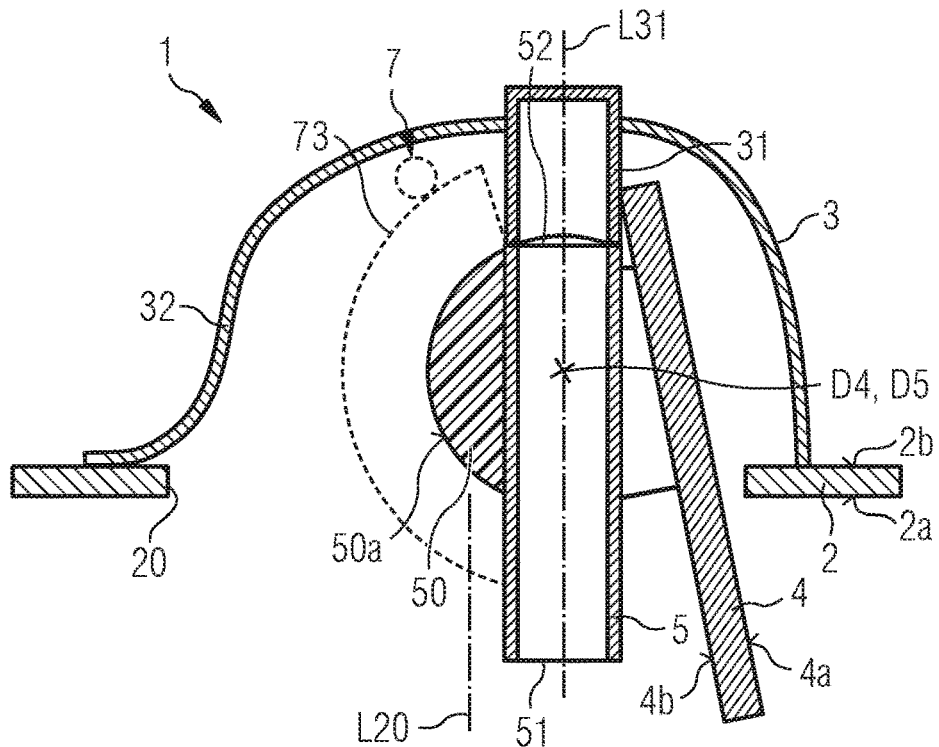
FIG. 9 shows a schematic sectional view of the connector system from FIG. 8, wherein the connector port is illustrated in a use position, and the cover is illustrated in an opening position.

A further connector system 1 is illustrated in an exemplary manner in FIGS. 8 and 9 which differs from the systems 1 illustrated in FIGS. 1 to 7 in particular by way of the mounting of the cover 4 and of the connector port 5 on the primary part 3, as well as by way of the sealing between the primary part 3 and the connector port 5.

As can be seen in FIGS. 8 and 9, the primary part 3 is designed substantially as has been described above. In particular, the primary part 3 has a pipeline connector 31 which is guided through the through opening 33 of the main portion 32, or configures the through opening 33, respectively. In contrast to FIGS. 1 to 7, the connector port 5 in FIGS. 7 and 8 is not mounted on the primary part 3 so as to be displaceable in a linear manner but mounted on the primary part 3 so as to be pivotable about a rotation axis D5, between the use position and the storage position, for example by way of a rotary joint (not illustrated) which is connected to the main portion 32 of the primary part 3 and defines the rotation axis D5. The connector port 5 is illustrated in the storage position in FIG. 8. As can be seen in FIG. 8, the connector port 5 in the storage position extends so as to be transverse to the clearance longitudinal axis L20 and is completely disposed on the internal side. Furthermore, the second end 52 of the port 5 is disposed so as to be spaced apart from the pipeline connector 31, or so as to be spatially separated from the latter, respectively. In the storage position of the connector port 5, the second end 52 thereof is thus decoupled from the pipeline connector 31.

As is moreover illustrated in an exemplary manner in FIG. 8, the connector port 5 can have an optional blocking portion 50. The blocking portion 50 can, for example, be moulded on or fastened to the line portion 53 of the connector port 5. The blocking portion 50 projects laterally from the connector port 5 and has a, for example, spherical sealing face 50a which by way of a constant radius is curved about the rotation axis D5. The rotation axis D5 about which the port 5 is pivotable, forms a centre of the curvature of the sealing face 50a. As is schematically illustrated in FIG. 8, the sealing face 50a in the storage position of the connector port 5 bears on the pipeline connector 31 and seals a flow cross section 31S of the pipeline connector 31. The pipeline connector 31 is thus closed in a fluid-tight manner by the blocking portion 50.

The connector port 5 in FIG. 9 is illustrated in the use position to which the connector port 5 is moved from the storage position shown in FIG. 8 by being pivoted about the rotation axis D5. The rotation axis D5 preferably lies on a central axis L31 of the pipeline connector 31 that is defined by the flow cross section 31S. Furthermore, the rotation axis D5 extends so as to be transverse to the clearance longitudinal axis L20. The second end 52 of the connector port 5 in the use position is thus coupled to the pipeline connector 31 of the primary part 3, and the blocking portion 50 is moved out of the flow cross section 31S of the pipeline connector 31. Furthermore, the first end 51 of the connector port 5 in the use position of the latter projects beyond the external face 2a of the skin panel 2.

The optional kinematic coupling between the cover 4 and the connector port 5 in the system 1 that is illustrated in an exemplary manner in FIGS. 8 and 9 is implemented in that the cover 4 and the connector port 5 are fixedly connected to one another by way of a connecting portion 54 which extends between the line portion 51 and the internal face 4b of the cover 4. The cover 4 and the connector port 5 are thus disposed in a mutually stationary manner and are in each case mounted on the primary part 3 so as to be rotatable about the same rotation axis D4, D5. Alternatively, a pivotable mounting of the cover 4 can also be provided on the primary part 3, such as is illustrated, for example, in FIGS. 1 to 3. The optional kinematic coupling between the cover 4 and the connector port 5 in this instance can likewise take place by way of a connecting rod 8, as has been explained above or as is illustrated in an exemplary manner in FIG. 10.

An electric motor 72 is provided as an optional drive installation 7 in the system 1 that is shown in an exemplary manner in FIGS. 8 and 9. For example, a gear rim 73 can be connected to the connector port 5, the gear rim 73 being rotatable by the electric motor 72, or by a gear wheel (not illustrated) which is rotated by a drive shaft of the electric motor 72, respectively.

Figure 10:
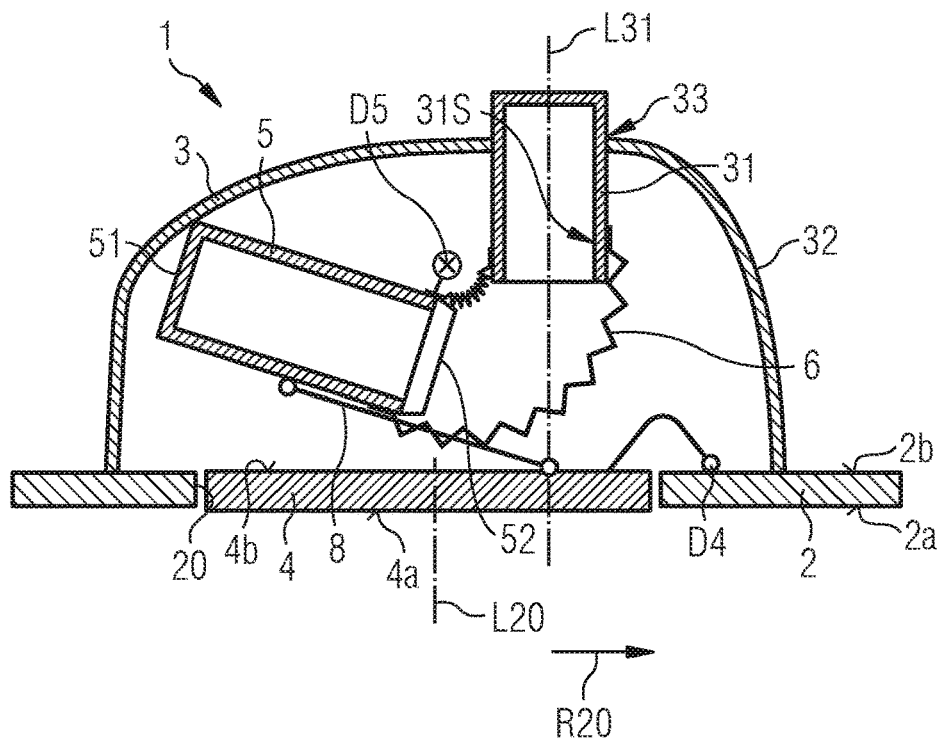
FIG. 10 shows a schematic sectional view of a connector system according to one further exemplary embodiment of the disclosure herein, wherein a connector port is illustrated in a storage position, and a cover is illustrated in a closing position.

FIG. 10 shows in an exemplary manner a further connector system 1. In a manner similar to FIGS. 8 and 9, the connector port 5 is mounted on the primary part 3 so as to be pivotable about a rotation axis D5 which extends so as to be transverse to the clearance longitudinal axis L20, between the use position and the storage position, for example by way of a rotary joint (not illustrated) that is connected to the main portion 32 of the primary part 3 and defines the rotation axis D5. In contrast to FIGS. 8 and 9, the rotation axis D5 in the system 1 shown in FIG. 10 in terms of the radial direction R20 is however disposed so as to be laterally offset towards the central axis L31 of the pipeline connector 31, or so as to be lateral to the pipeline connector 31, respectively. In contrast to FIGS. 8 and 9, the connector port 5 in FIG. 10 does not have a blocking portion 50. Instead, in a manner similar to the systems 1 in FIGS. 1 to 7, a sealing sleeve 6 which encloses the connector port 5 and the pipeline portion 31 is provided in FIG. 10.

The connector port 5 in FIG. 10 is illustrated in the storage position. As can be seen in FIG. 10, the connector port 5 in the storage position extends so as to be transverse to the clearance longitudinal axis L20 and is completely disposed on the internal side. Furthermore, the second end 52 of the port 5 is disposed so as to be spaced apart from the pipeline connector 31, or so as to be spatially separated from the latter, respectively. In the storage position of the connector port 5, the second end 52 thereof is thus decoupled from the pipeline connector 31. In the use position (not illustrated) the second end 52 of the connector port 5 is coupled to the pipeline connector 31 of the primary part 3, and the first end 51 of the connector port 5 projects beyond the external face 2a of the skin panel 2.

The cover 4 in FIG. 10 is mounted on the primary part 3, for example by way of a rotary joint (not illustrated), so as to be rotatable about a rotation axis D4 which extends so as to be transverse to the central axis M20 of the clearance 20 and in terms of the radial direction R is disposed outside the clearance 20. As is schematically illustrated in FIG. 10, the cover 4 is coupled to the rotary joint by a curved hinge. The optional kinematic coupling between the cover 4 and the connector port 5 can take place in a manner similar to that in FIGS. 1 to 3 by way of a connecting rod 8 which is fastened so as to be in each case rotatable on the cover 4 and the connector port 5. The drive installation 7 can be implemented as in FIGS. 1 and 2, for example, and be coupled to the cover 4 by way of a rod assembly as described.

As has already been explained at the outset, FIG. 12 in an exemplary and schematic manner shows an aircraft 100 in the form of a passenger aircraft which has the connector system 1 described above. The skin panel 2 can in particular form part of an external skin of the fuselage 101 or of a wing 102 of the aircraft 100. The connector port 5 by way of the pipeline connector 31 is fluidically conductively connected to a liquids tank (not illustrated) of the aircraft 100, for example by way of a pipeline. The cover 4 in FIG. 12 is illustrated in the opening position, and an external hose P is connected to the port 5 (not shown in FIG. 12) in order for liquid to be discharged from the tank of the aircraft 100, or to be supplied to the latter.

While the disclosure herein has been explained in an exemplary manner above by exemplary embodiments, the disclosure herein is not limited thereto but can be modified in many ways. Combinations of the preceding exemplary embodiments are in particular also conceivable.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS

1 Connector system
2 Skin panel
2a External face
2b Internal face
3 Primary part
4 Cover
4a External face of the cover
4b Internal face of the cover
5 Connector port
5A Appendage
6 Sealing sleeve
7 Drive installation
8 Connecting rod
9 Rod assembly
10 Gearbox
15 Spindle bushing
20 Clearance
30 Guide portion
30A Slot
31 Pipeline connector
31S Flow cross section
32 Main portion
33 Through opening
34 Flange portion
35 Cover guide structure
40 Closure hump
45 Bearing structure
50 Blocking portion
51 First end of the connector port
52 Second end of the connector port
53 Line portion
54 Connecting portion
71 Linear drive
72 Electric motor
73 Gear rim
91 First joint
92 First rod
93 Second joint
94 Second rod
95 Third joint
100 Aircraft
101 Fuselage
102 Wing
A7 Arrow
D4 Rotation axis of the cover
D5 Rotation axis of the connector port
F30 Guide track
F35 Guide axis
L20 Central axis of the clearance/clearance longitudinal axis
P Hose
R20 Radial direction

The invention claimed is:

1. A connector system for an aircraft, for connecting a hose line, comprising:
a skin panel which has a clearance which extends between an external face and an internal face;
a primary part which on the clearance is disposed on an internal side of the skin panel that is defined by the internal face;
a cover mounted on the primary part and movable between a closing position in which the cover covers the clearance of the skin panel, and an opening position in which the cover releases the clearance of the skin panel; and a tubular connector port mounted on the primary part and movable between a storage position in which the connector port is disposed on the internal side of the skin panel, and a use position in which the connector port projects beyond the external face of the skin panel.

2. The connector system according to claim 1, wherein the cover and the connector port are kinematically coupled such that a movement of the cover or of the connector port causes a movement of the respective other of the cover and connector port.

3. The connector system according to claim 1, wherein the primary part has a guide portion which defines a linear guide track along which the connector port is guided between the use position and the storage position.

4. The connector system according to claim 1, wherein the connector port on the primary part is guided so as to be pivotable about a rotation axis between the use position and the storage position, wherein in the use position a first end of the connector port projects beyond the external face of the skin panel, and a second end of the connector port is coupled to a pipeline connector of the primary part that is opposite the clearance of the skin panel, and wherein in the storage position the second end of the connector port is decoupled from the pipeline connector.

5. The connector system according to claim 4, wherein the connector port has a blocking portion having a sealing face which by a constant radius is curved about the rotation axis and which in the storage position of the connector port bears on the pipeline connector and covers a flow cross section of the pipeline connector.

6. The connector system according to claim 1, wherein the connector port in relation to the primary part is sealed by a sealing sleeve.

7. The connector system according to claim 1, wherein the cover is pivotable about a rotation axis which extends so as to be transverse to a central axis of the clearance of the skin panel.

8. The connector system according to claim 1, wherein the primary part has a cover guide structure which defines a linear guide axis which extends along a central axis of the clearance of the skin panel, and wherein the cover is mounted on the cover guide structure and displaceable along the guide axis and pivotable about the guide axis.

9. The connector system according to claim 1, additionally comprising:

a drive installation which is coupled to the cover to move it between the opening position and the closing position, or which is coupled to the connector port to move it between the storage position and the use position.

10. An aircraft having a connector system according claim 1.

* * * * *